(12) United States Patent
Liu

(10) Patent No.: US 12,376,068 B2
(45) Date of Patent: Jul. 29, 2025

(54) POSITIONING REFERENCE SIGNAL TRANSMISSION METHOD AND ELECTRONIC DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 401 days.

(21) Appl. No.: 17/928,603

(22) PCT Filed: Jun. 5, 2020

(86) PCT No.: PCT/CN2020/094724
§ 371 (c)(1),
(2) Date: Nov. 29, 2022

(87) PCT Pub. No.: WO2021/243712
PCT Pub. Date: Dec. 9, 2021

(65) Prior Publication Data
US 2023/0300781 A1 Sep. 21, 2023

(51) Int. Cl.
*H04W 64/00* (2009.01)
*H04W 28/02* (2009.01)

(52) U.S. Cl.
CPC ..... *H04W 64/003* (2013.01); *H04W 28/0247* (2013.01)

(58) Field of Classification Search
CPC ........... H04W 64/003; H04W 28/0247; H04W 64/00; G01S 5/0009; G01S 5/0205; H04L 5/0012; H04L 5/0023; H04L 5/0048; H04L 5/0064; H04L 5/0069; H04L 5/0092; H04L 27/26132
See application file for complete search history.

(56) References Cited

U.S. PATENT DOCUMENTS

2010/0260154 A1\* 10/2010 Frank .................... G01S 5/0205
370/336
2019/0215121 A1  7/2019 Lin et al.
(Continued)

FOREIGN PATENT DOCUMENTS

CN  109792361 A  5/2019
EP  3487109 A1   5/2019

OTHER PUBLICATIONS

Indian Patent Application No. 202247075917, Search and Opinion dated Jun. 28, 2024, 2 pages.
(Continued)

*Primary Examiner* — Kabir A Timory
(74) *Attorney, Agent, or Firm* — Cozen O'Connor

(57) ABSTRACT

A method for sending a positioning reference signal (PRS) is performed by a base station which sends a composite PRS according to a composite sequence. The composite sequence includes multiple sub-sequences, and a part of the composite PRS corresponding to the sub-sequence is a truncated PRS. A bandwidth occupied by the composite PRS is greater than a bandwidth occupied by the truncated PRS; and the composite PRS and the truncated PRS are configured for positioning measurement of different types of UEs. A method for receiving the PRS, a UE and a base station are also disclosed.

10 Claims, 4 Drawing Sheets

(56) References Cited

U.S. PATENT DOCUMENTS

2020/0107286 A1    4/2020  Akkarakaran et al.
2020/0169336 A1*   5/2020  Modarres Razavi .. H04B 17/27

OTHER PUBLICATIONS

PCT/CN2020/094724 English translation of International Search Report dated Feb. 19, 2021, 2 pages.
European Patent Application No. 20938943.6, Search and Opinion dated Jun. 20, 2023, 9 pages.
Ericsson "On design of OTDOA positioning reference signal" 3GPP TSG RAN WG1 Meeting #87, R1-1611116, Nov. 2016, 5 pages.

* cited by examiner

POSITIONING REFERENCE SIGNAL TRANSMISSION METHOD AND ELECTRONIC DEVICE

CROSS-REFERENCE TO RELATED APPLICATION

This application is the US national phase application of International Application No. PCT/CN2020/094724, filed on Jun. 5, 2020, the entire contents of which are incorporated herein by reference for all purposes.

TECHNICAL FIELD

The present disclosure relates to a field of wireless communication technologies, and particularly to a method and an apparatus for transmitting a position reference signal (PRS), an electronic device and a storage medium.

BACKGROUND

At present, a 3rd generation partnership project (3GPP) has conducted a project research on reduced capability New Radio (NR) devices (Redcap) in a communication protocol Release (R) 17 version, aiming at reducing complexity of a user equipment (UE) and saving cost while coexisting with R15 terminals and R16 terminals.

A positioning reference signal (PRS) is a downlink signal transmitted by an up base station. The PRS may be configured for positioning of the UE. However, the proposal of Redcap UE will challenge sending of PRS to adapt to the bandwidth supported by Redcap UE.

SUMMARY

According a first aspect of the present disclosure, a method for sending a PRS is provided, and includes:

sending a composite PRS based on a composite sequence.

The composite sequence includes a plurality of sub-sequences; and a part of the composite PRS corresponding to the sub-sequence is a truncated PRS.

A bandwidth occupied by the composite PRS is greater than a bandwidth occupied by the truncated PRS, and the composite PRS and the truncated PRS are configured for positioning measurement of different types of UEs.

According to a second aspect of the present disclosure, a method for receiving a PRS is provided, and includes:

receiving a composite PRS or a truncated PRS based on the UE type; wherein, the composite PRS is sent based on a composite sequence; and the truncated PRS is a part of the composite PRS, and sent based on a sub-sequence of the composite sequence.

According to a third aspect of the present disclosure, a communication device is provided, and includes a processor, a transceiver, a memory and an executable program stored on the memory and capable of being run by the processor. When the processor runs the executable program, the method as described in the first aspect and/or a second solution is implemented.

BRIEF DESCRIPTION OF THE DRAWINGS

The drawings herein are incorporated into the specification and constitute a part of the specification, illustrate embodiments in conformity with the present disclosure, and explain the principle of embodiments of the present disclosure together with the specification.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, and second information may also be referred to as first information. It depends on the context. For example, the word "in case of", "if" as used herein may be interpreted as "in a case that" or "when" or "in response to determining".

In order to describe any embodiment of the disclosure better, one embodiment of the present disclosure is illustrated by taking an application scene of a meter intelligent control system for an example.

Figure 1:
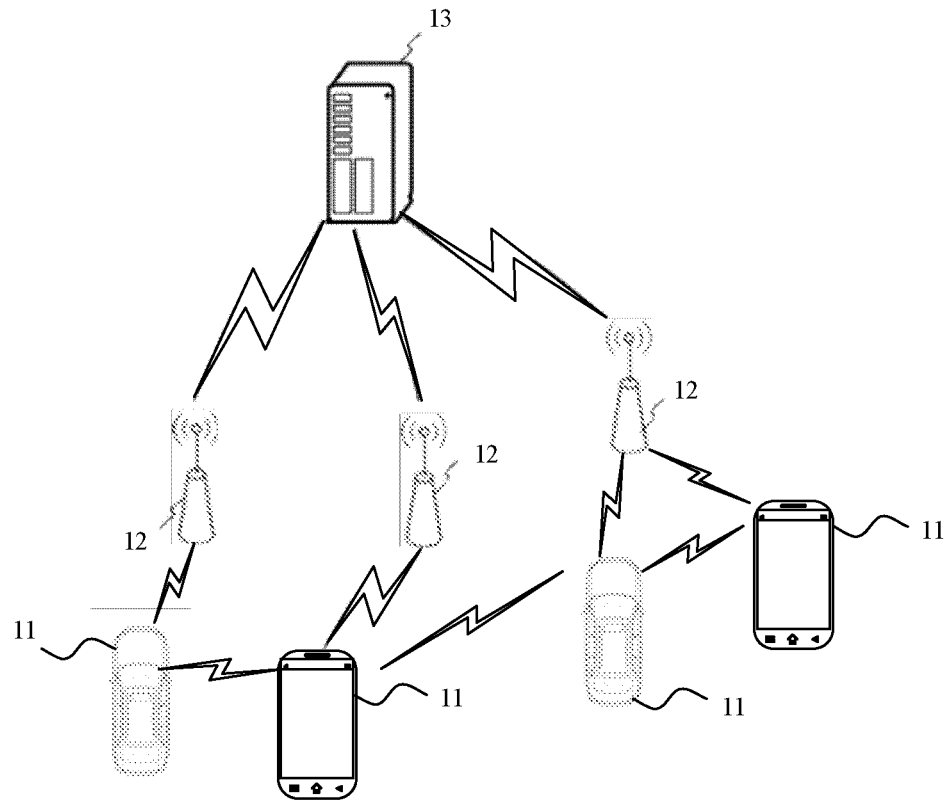
FIG. 1 is a diagram illustrating a structure of a wireless communication system according to an exemplary embodiment.

FIG. 1 is a diagram illustrating a structure of a wireless communication system in embodiments of the present disclosure. As illustrated in FIG. 1, the wireless communication system is a communication system based on a cellular mobile communication technology. The wireless communication system may include several terminals 11 and several base stations 12.

The terminal 11 may refer to a device that provides voice and/or data connectivity for users. The terminal 11 may communicate with one or more core networks through a radio access network (RAN). The terminal 11 may be an internet of things terminal, for example, a sensor device, a mobile phone (or referred to as a cellular phone) and a computer having an internet of things terminal, for example, may be a fixed, portable, compact, handheld, computer built-in or vehicle apparatus, for example, a station (STA), a subscriber unit, a subscriber station, a mobile station, a mobile, a remote station, an access point, a remote terminal, an access terminal, a user terminal, a user agent, a user device or a user equipment (UE). Or, the terminal 11 may be a device of an unmanned vehicle. Or, the terminal 11 also may be a vehicle device, for example, may be a vehicle computer with a wireless communication function, or a wireless terminal externally connected to a vehicle computer. Or, the terminal 11 also may be a roadside device, for example, may be a street lamp, a signal lamp or other roadside device with a wireless communication function.

The base station 12 may be a network side device in the wireless communications system. The wireless communication system may be a 4th generation mobile communication (4G) system, also referred to as a long term evolution (LTE) system; or the wireless communications system may be a 5G system, also referred to as a new radio (NR) system or a 5G NR system. Or, the wireless communication system may be a next generation system of the 5G system. An access network in the 5G NR system may be referred to as a new generation-radio access network (NG-RAN).

The base station 12 may be an eNB adopted in the 4G system. Or, the base station 12 may be a base station with a centralized-distributed architecture (gNB) in the 5G system. When the base station 12 adopts the centralized-distributed architecture, it generally includes a central unit (CU) and at least two distributed units (DUs). Protocol stacks at a Packet Data Convergence Protocol (PDCP) layer, a Radio Link Control (RLC) layer and a Media Access Control (MAC) layer are configured in the CU; a physical (PHY) layer protocol is configured in the DU. The specific implementation of the base station 12 is not limited in embodiments of the disclosure.

The base station 12 may establish a wireless connection with the terminal 11 through a radio air interface. In different implementations, the radio air interface is a radio air interface based on a 4G standard; or, the radio air interface is a radio air interface based on a 5G standard, for example, the radio air interface is a new air interface; or, the radio air interface may be a radio air interface based on a next generation mobile communication network technology standard of a 5G.

In some embodiments, an end to end (E2E) connection further may be established between terminals 11, for example, in scenes such as vehicle to vehicle (V2V) communication, vehicle to infrastructure (V2I) communication and vehicle to pedestrian (V2P) communication in vehicle to everything (V2X).

In some embodiments, the wireless communication system may further include a network management device 130.

Several base stations 12 may be connected with the network management device 130. The network management device 130 may be a core network device in the wireless communications system, for example, the network management device 130 may be a mobility management entity (MME) in an evolved packet core (EPC). Or, the network management device may be other core network devices, for example, a Serving GateWay (SGW), a Public Data Network GateWay (PGW), a Policy and Charging Rules Function (PCRF) or a Home Subscriber Server (HSS), etc. The implementation form of the network management device 130 is not limited in embodiments of the disclosure.

Figure 2:
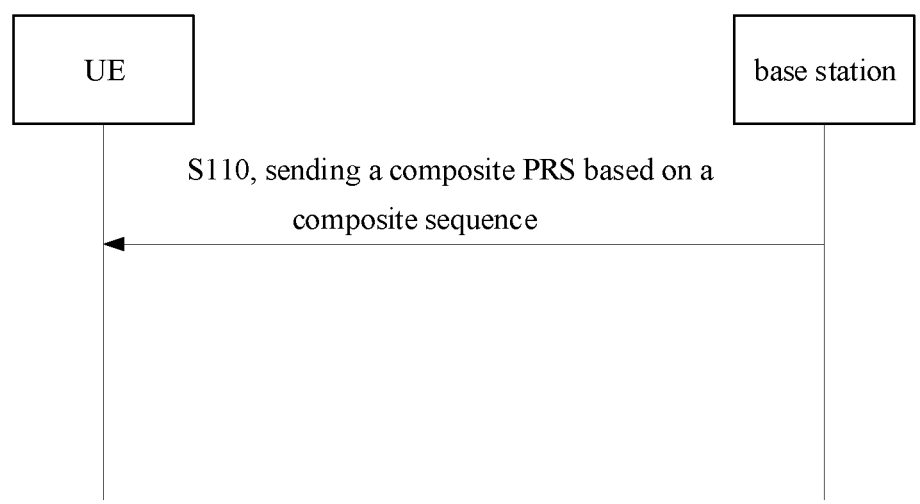
FIG. 2 is a flowchart illustrating a method for sending a PRS according to an exemplary embodiment.

As illustrated in FIG. 2, a method for sending a PRS is provided in the embodiment. The method includes:

S110, sending a composite PRS based on a composite sequence.

The composite sequence includes a plurality of sub-sequences; and a part of the composite PRS corresponding to the sub-sequence is a truncated PRS.

A bandwidth occupied by the composite PRS is greater than a bandwidth occupied by the truncated PRS, and the composite PRS and the truncated PRS are configured for positioning measurement of different types of UEs.

The method for sending a PRS in the embodiments of the present disclosure may be applied to a base station. The base station may assist a UE in its positioning measurement by sending the PRS. For example, the UE may determine a distance between the UE itself and the base station based on a received power of the PRS received. For another example, an angle between the UE and the base station may be further determined based on a direction of a beam sending the PRS, so that the base station may assist the UE in its own positioning measurement through sending of the PRS.

In some embodiments, UEs at least may be divided into a first type UE and a second type UE based on a bandwidth supported.

The first type UE may be a reduced capability NR device, also referred to as a reduced UE. The second type UE may include an eMBB UE.

In an application process, the types of the first type UE and the second type UE may be differentiated based on the ability of the UE (for example, the supported bandwidth). The maximum bandwidth supported by the first type UE is less than that supported by some second types of UEs.

The composite sequence is a sequence forming a PRS. The composite sequence may be split into a plurality of sub-sequences. The composite sequence itself and the split sub-sequences themselves all satisfy the requirement of sequences in communication.

For example, the composite sequence itself and the sub-sequence forming the truncated PRS cannot be all "1" sequences or all "0".

For another example, the difference between different composite sequences is large enough, so that the UE can distinguish which PRS corresponding to which PRS sequence is currently received, and the plurality of sub-sequences split from one composite sequence also satisfy the requirement that the difference degree is large enough, for example, the difference degree is greater than a threshold, for example, a predetermined number of bit values are not the same, so that the UE can correctly receive the truncated PRS that needs to be received.

In some particular cases, the plurality of sub-sequences split from one composite sequence may be orthogonal. The orthogonality of the sub-sequences is a manifestation that the difference degree is large enough.

In one embodiment, when one composite sequence may be split into two sub-sequences, the length of one composite sequence is not less than a sum of two sub-sequences.

In another embodiment, in order to simplify PRS transmission of the base station, a start position of a first sub-sequence is a start position of the composite sequence, and/or an end position of a last sub-sequence may be an end position of the composite sequence.

In some embodiments, the sub-sequence may be formed by bits continuously distributed in the composite sequence; in other embodiments, the sub-sequence may be formed by bits discretely distributed in the composite sequence. For example, when the composite sequence includes 2m bits, one sub-sequence may be composed of even number of bits in 2m bits, or may be composed of odd number of bits.

In conclusion, different types of UEs can perform positioning based on the composite PRS or the truncated PRS corresponding to the same composite sequence, and the base station can maintain one sequence set of composite sequences, thereby simplifying the sequence set stored in the base station.

A cell formed by the base station may include the first type UE, or may include UEs in addition to a predetermined type of UE. The bandwidths supported by the two types of UEs are different. When the base station needs to send the PRS without differentiating the UE type to reduce a PRS transmission complexity caused by PRS sending of the base station differentiating the UE type, it needs to be ensured that the first type UE can receive the PRS and can perform positioning measurement based on the received PRS. Since the composite PRS and the truncated PRS both can be configured for positioning measurement of the UE, the PRS directly sent based on the composite sequence can be applied to positioning measurement of different types of UEs, so that different types of UEs can complete positioning measurement successfully based on the received PRS.

In some cases, when a plurality of UEs in the cell need to perform positioning at the same time, the base station may broadcast or multicast the composite PRS based on the composite sequence, and different types of UEs may select to receive the composite PRS or the truncated PRS based on the PRS configuration given by the base station or their own types, so that the base station not only can assist in positioning of a plurality of UEs through sending the PRS once, but also can assist in positioning of different types of UEs through sending the PRS once. In one embodiment, the composite sequence includes being composed of the sub-sequences;

or, the sub-sequence is formed by truncating the composite sequence.

In one case, the base station may generate the composite sequence based on a sequence generation algorithm, and split the composite sequence into one or more sub-sequences.

In another case, the base station may generate sub-sequences based on a sequence generation algorithm, and combine a plurality of sub-sequences based on a certain combination strategy, to form the composite sequence.

In one embodiment, at least two different types of UEs include: a first type UE and a second type UE; a bandwidth supported by the first type UE is less than a bandwidth supported by the second type UE; and a bandwidth occupied by the truncated PRS transmission is less than or equal to the bandwidth supported by the first type UE.

When different types of UEs may be divided into at least two types based on the supported bandwidth, and the bandwidth supported by the first type UE is smaller, in order to facilitate positioning of the first type UE, the truncated PRS is configured for positioning of the first type UE, so that the bandwidth occupied by the truncated PRS transmission is less than or equal to the bandwidth supported by the first type UE.

For example, the bandwidth supported by the first type UE is not greater than 40M, and the bandwidth occupied by the truncated PRS transmission is less than or equal to 40M. When the bandwidth supported by the first type UE is greater than 20M, the bandwidth occupied by the truncated PRS transmission is less than or equal to 20M. When the maximum bandwidth supported by the first type UE is 10M, the bandwidth occupied by the truncated PRS transmission is less than or equal to 10M.

In this way, it is ensured that the truncated PRS can be successfully received by the first type UE.

Moreover, the bandwidth occupied by sending the composite PRS is less than or equal to the bandwidth by the second type UE, so that it may be ensured that the second type UE can successfully receive the composite PRS, thereby achieving successful positioning of the second type UE.

To ensure the received power of the PRS and successful positioning of the UE, in an embodiment of the present disclosure, the PRS may have a repetition configuration, and the repetition configuration may be configured to repeatedly send the PRS.

S110 may include:

repeatedly sending the composite PRS based on the composite sequence and the repetition configuration.

The repetition configuration at least includes:

a number of repetitions, indicating a number of repetitions of the composite PRS;

and/or, a repetition resource configuration, indicating a resource for repeating the composite PRS.

When the number of repetitions is M, the PRS may be sent M times.

The repetition resource configuration indicates a time domain resource, a frequency domain resource, and/or a beam resource for repeatedly sending the composite PRS.

It is to be noted that, in order to simplify receiving of the truncated PRS by the UE supporting the small bandwidth, the truncated PRS corresponding to one sub-sequence generally may be configured for repeated sending on the same frequency band, so that the UE receiving the truncated PRS can receive the truncated PRS without switching a receiving frequency band.

Of course, in order to have a frequency gain, when a plurality of repeated sending is performed, the PRS may be sent on different frequency bands different times. In this case, in order to simplify receiving of the UE switching frequency band, different frequency bands may be continuous in the frequency domain.

Figure 3:
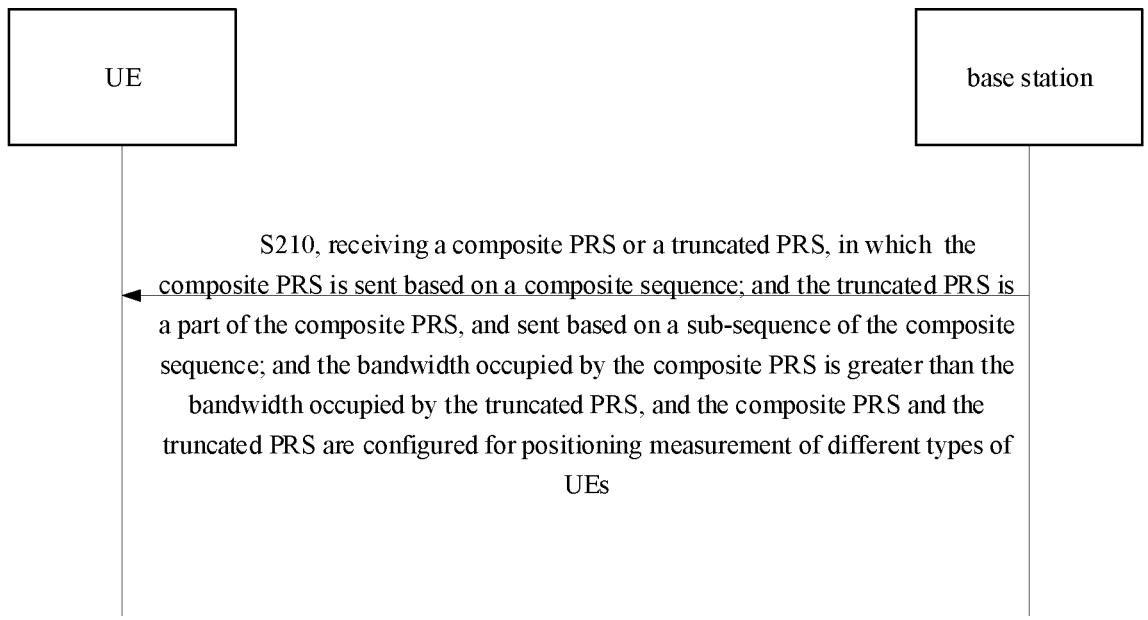
FIG. 3 is a flowchart illustrating a method for receiving a PRS according to an exemplary embodiment.

As illustrated in FIG. 3, a method for receiving a PRS is provided in this embodiment. The method includes:

S210, receiving a composite PRS or a truncated PRS is received. The composite PRS is sent based on a composite sequence; and the truncated PRS is a part of the composite PRS, and sent based on a sub-sequence of the composite sequence; and the bandwidth occupied by the composite PRS is greater than the bandwidth occupied by the truncated PRS, and the composite PRS and the truncated PRS are configured for positioning measurement of different types of UEs.

The method for receiving a PRS provided in the embodiments of the present disclosure is a method applied to a UE. The UE may be various types of UEs, for example, a UE supporting a large bandwidth and/or a UE supporting a small bandwidth, for example, the above Redcap UE and/or eMBB UE, etc.

The UE may select to receive the composite PRS or the truncated PRS based on its own type. For example, a current UE is a UE supporting a small bandwidth, and may select to receive the truncated PRS, so that the PRS may be truncated based on the resource configuration of the truncated PRS. When the current UE is a UE supporting a large bandwidth, it may select to receive the composite PRS, for example, may receive the composite PRS based on the resource configuration of the composite PRS.

In summary, the base station may send the composite PRS based on the composite sequence, and different types of UE may receive the composite PRS or the truncated PRS based on one sending of the composite PRS of the base station, and perform positioning based on the received PRS, thereby determining a relative position between the UE itself and the base station and completing its own positioning.

In some embodiments, S210 may include: receiving the truncated PRS in response to the UE being a first type UE; and receiving the composite PRS in response to the UE being a second type UE. A bandwidth supported by the second type UE is greater than a bandwidth supported by the first type UE.

Different types of UEs at least may be divided into two types: one is the first type UE, and the other is the second type UE. The bandwidth supported by the first type UE is less than the bandwidth supported by the second type UE, therefore, the first type UE may receive the truncated PRS, and the second type UE supporting a larger bandwidth may receive the composite PRS.

When the base station needs to assist a plurality of UEs in positioning at the same time, the plurality of UEs may be assisted in positioning by means of one sending of the composite PRS.

In some embodiments, S210 includes:
repeatedly receiving the composite PRS or the truncated PRS based on the UE type and a repetition configuration.

The repetition configuration at least includes:
a number of repetitions, indicating a number of repetitions of the composite PRS;
and/or,
a repetition resource configuration, indicating a resource for repeating the composite PRS.

In some embodiments, in order to ensure successful receiving of the PRS, the PRS may have the repetition configuration, and in this case, the base station may repeatedly send the PRS, and the UE may repeatedly receive the PRS many times, and the UE receives the truncated PRS or the composite PRS based on its own type, or a PRS configuration sent by the base station with a UE as a granularity.

In some embodiments, repeatedly receiving the composite PRS or the truncated PRS based on the UE type and the repetition configuration, includes:
repeatedly receiving the composite PRS or the truncated PRS on different symbols of a same frequency band based on a time domain repetition configuration, in response to the repetition configuration being the time domain repetition configuration.

Figure 4:
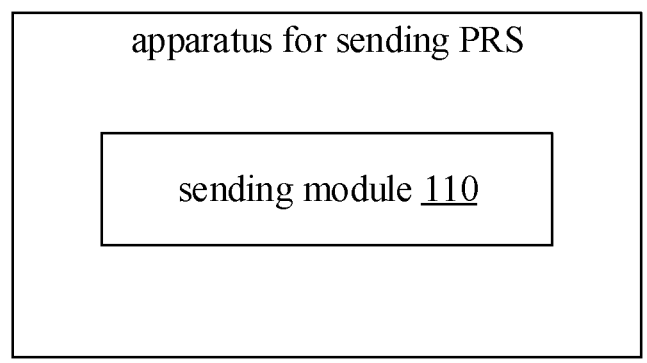
FIG. 4 is a block diagram illustrating an apparatus for sending a PRS according to an exemplary embodiment.

As illustrated in FIG. 4, an apparatus for sending a position reference signal (PRS) is provided and includes a sending module 110.

The sending module 110 is configured to send a composite PRS based on a composite sequence.

The composite sequence includes a plurality of sub-sequences; and a part of the composite PRS corresponding to the sub-sequence is a truncated PRS.

A bandwidth occupied by the composite PRS is greater than a bandwidth occupied by the truncated PRS, and the composite PRS and the truncated PRS are configured for positioning measurement of different types of UEs.

In some embodiments, the sending module 110 may be a program module, and the program module can implement sending the composite PRS based on the composite sequence when executed by a processor.

In other embodiments, the receiving module may be software and hardware combination modules; the software and hardware combination module includes but not limited to: a programmable array; the programmable array includes but not limited to a complex programmable array or a field programmable array.

In other embodiments, the receiving module further include a pure hardware module; the pure hardware module includes but not limited to an application-specific integrated circuit.

In some embodiments, the composite sequence is composed of the sub-sequences; or, the sub-sequence is formed by truncating the composite sequence.

In some embodiments, at least two different types of UEs include: a first type UE and a second type UE; a bandwidth supported by the first type UE is less than a bandwidth supported by the second type UE; and
a bandwidth occupied by the truncated PRS transmission is less than or equal to the bandwidth supported by the first type UE.

In some embodiments, the sending module 110 is configured to send repeatedly the composite PRS based on the composite sequence and a repetition configuration.

The repetition configuration at least includes:
a number of repetitions, indicating a number of repetitions of the composite PRS;
and/or,
a repetition resource configuration, indicating a resource for repeating the composite PRS.

In some embodiments, the repetition configuration includes:
a time domain repetition configuration, indicating a time domain resource used for repeatedly sending the composite PRS in a time domain.

A plurality of repetitions of the truncated PRS are located on different symbols of the same frequency band in response to the repetition resource configuration being the time domain repetition configuration.

Figure 5:
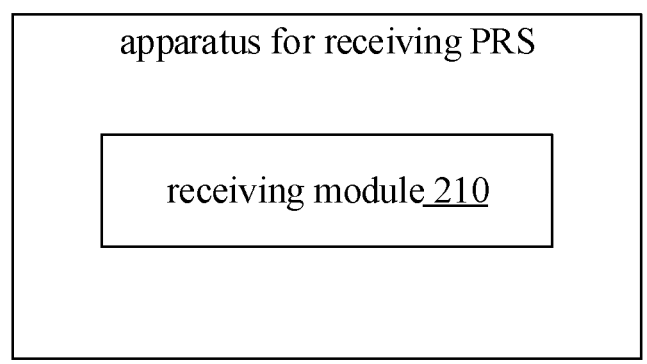
FIG. 5 is a block diagram illustrating an apparatus for receiving a PRS according to an exemplary embodiment.

As illustrated in FIG. 5, an apparatus for transmitting a PRS is provided in this embodiment of the present disclosure, and includes a receiving module 210.

The receiving module 210 is configured to receive a composite PRS or a truncated PRS. The composite PRS is sent based on a composite sequence; and the truncated PRS is a part of the composite PRS, and sent based on a sub-sequence of the composite sequence.

A bandwidth occupied by the composite PRS is greater than a bandwidth occupied by the truncated PRS, and the composite PRS and the truncated PRS are configured for positioning measurement of different types of UEs.

In some embodiments, the receiving module 210 may be a program module, and the program module may implement receiving the composite PRS or the truncated PRS when executed by a processor.

In other embodiments, the receiving module 210 may be software and hardware combination modules; the software and hardware combination module includes but not limited to: a programmable array; the programmable array includes but not limited to a complex programmable array or a field programmable array.

In other embodiments, the receiving module 210 and the demodulation module further include a pure hardware module; the pure hardware module includes but not limited to an application-specific integrated circuit.

In some embodiments, the receiving module 210 is configured to receive the truncated PRS in response to the UE being a first type UE; and receive the composite PRS in response to the UE being a second type UE; in which, the bandwidth supported by the second type UE is greater than the bandwidth supported by the first type UE.

In some embodiments, the receiving module 210 is configured to repeatedly receive the composite PRS or the truncated PRS based on the UE type and a repetition configuration.

The repetition configuration at least includes:
a number of repetitions, indicating the number of repetitions of the composite PRS;
and/or,
a repetition resource configuration, indicating a resource for repeating the composite PRS.

In some embodiments, repeatedly receiving the composite PRS or the truncated PRS based on the UE type and the repetition configuration, includes:
repeatedly receiving the composite PRS or the truncated PRS on different symbols of a same frequency band based on a time domain repetition configuration, in response to the repetition configuration being the time domain repetition configuration.

A method for transmitting a PRS is further provided in an embodiment of the disclosure, and includes: sending a PRS based on a UE type; in which different types of UE have different sending modes of PRS.

For example, for the above first type UE, the PRS is repeatedly sent on a first bandwidth; for the second type UE supporting a larger bandwidth than the first type UE, the PRS is sent on a second bandwidth. The second bandwidth is greater than the first bandwidth.

In some embodiments, the first bandwidth is less than or equal to a bandwidth supported by the first type UE.

The second bandwidth is greater than the bandwidth supported by the first type UE, and less than or equal to the bandwidth supported by the second type UE.

In some embodiments, the second bandwidth is more than twice the first bandwidth.

In some embodiments, a first number of time domain resources occupied by the PRS of the first type UE is greater than a second number of time domain resources occupied by the PRS of the second type UE.

In other embodiments, the total number of communication resources corresponding to the first bandwidth and the first number of time domain resources may be the same as the total number of communication resources corresponding to the second bandwidth and the second number of time domain resources.

In some embodiments, the second bandwidth is more than twice the first bandwidth; and the second number of time domain resource number is ½ the first number of time domain resource number.

Of course, in other embodiments, the second bandwidth may be ¾ the second bandwidth.

The time domain units corresponding to the second number of time domain resources are discretely distributed in the time domain; and the time domain units corresponding to the first number of time domain resources are continuously distributed in the time domain. The time domain unit herein includes but not limited to a symbol or a mini-slot. The discrete distribution may space the time domain units of the second number of time domain resources.

For example, the time domain unit is a symbol, the second number of time domain resources is 2, and the first number of time domain resources is 4, then at least two symbols are spaced between the two symbols corresponding to the second number of time domain resources. In this way, for PRS transmission of different types of UEs, the same resource pool may be used for transmission, so that different types of UEs may share the same resource pool for transmitting the PRS.

In some cases, the first type UE includes but not limited to an enhance Mobile Broadband (eMBB) UE.

For example, for PRS transmission of the eMBB UE, transmission is performed on two symbols of one resource element (RE), while for PRS transmission of a redcap UE, transmission is performed on four symbols on a half RE.

The PRS transmission here includes PRS sending of the base station and/or PRS receiving of the UE.

In embodiments of the present disclosure, for different types of UEs, the base station and the UE transmit the PRS in different modes, to achieve PRS decoupling of different types of UEs, thereby ensuring that each type of UE may can receive the PRS suitable for its own positioning measurement, to achieve positioning measurement.

The following several specific examples are provided in combination with the above any embodiment.

Example 1

In an application scene, there is a sensor device, a video surveillance device and a wearable device, with a relatively low bandwidth of 20-40M, or even 10M. It takes a Redcap UE supporting a 20M bandwidth for an example.

The PRS is a downlink signal sent by a base station in a 3GPP NR for positioning. It is well known that the bandwidth is proportional to the precision of the positioning. Therefore, the bandwidth of the PRS ranges from the minimum 24 physical resource blocks (PRBs) to the maximum 272 PRBs, and the base station usually selects an appropriate bandwidth based on the positioning precision requirement and the situation of system resource, for example, 96 PRBs, SCS=30 KHz, approximately 35M, and configured with minimum two consecutive time domain symbols.

A larger bandwidth or more time domain symbols (or both) may be configured to improve the precision (precision improvement of an extension of a frequency domain bandwidth is higher than that of time domain repetition). However, since the Redcap UE is limited to the bandwidth, the bandwidth of the PRS can only be configured as the maximum bandwidth supported by the UE, for example, 20M, then the precision may be reduced a lot. In order to ensure that the Redcap UE may achieve a higher positioning precision under certain requirements, it is necessary to be compatible with Redcap UE in PRS configuration and save resources as much as possible.

Two symbols of a normal UE (i.e., the supported bandwidth of which is greater than that of the redcap UE) may be configured at an internal of RE. Due to exceeding the bandwidth of the Redcap UE, small bandwidth repetitions of four symbols are configured for the Redcap UE. However, this positioning precision not enough compared to that corresponding to the large bandwidth. Here is an example of 2 times, or it may be ¾ times the bandwidth.

Example 2

The PRS sequence with a bandwidth of n is configured by the base station to a Redcap UE in a cross-symbol frequency hopping manner, that is, a first part of the sequence is configured on a first symbol, a second part is configured on adjacent different bandwidths of a second symbol, and a third symbol and so on (when a bandwidth exceeds twice).

The PRS sequence of the PRS is divided into n parts in configuration, for example, two parts as illustrated in the figure. A first part is sent in a first symbol in a first frequency domain; and a second part is sent in a second symbol in a second frequency domain, and so on for third and fourth symbols.

Another solution is that the first part is sent in the first symbol in the first frequency domain; the second part is sent in a third symbol in the second frequency domain; and the second part is sent in the second symbol in the first frequency domain, as the second part in the figure.

The base station side ensures that the first part . . . the nth part inn parts are continuous in the frequency domain, and ensures that a modulation phase of a last modulation signal of a previous part in two adjacent parts and a modulation phase of a first modulation signal of a next part are continuous on a phase sequence of modulation phases. The above two configurations implicitly ensure that the phase continuity.

The base station also may not configure modulation phases of two adjacent parts continuous on a phase sequence corresponding to the modulation phases, but uses a plurality of repetitions in the time domain. The base station also may not configure the phase continuity, but configures by frequency hopping repetition.

The UE side: the UE receives the PRS based on the PRS configuration of the base station, and performs combined demodulation of different parts.

A communication device is provided in embodiments of the present disclosure, and includes a processor, a transceiver, a memory and an executable program stored on the memory and capable of being run by the processor. When the processor runs the executable program, the method applied to a UE provided in any above technical solution is executed, or the method applied to a base station provided in any above technical solution is executed.

The communication device may be the above base station or UE.

The processor may include various types of storage mediums. The storage medium is a non-transitory computer storage medium, and may continue memorizing information stored thereon when the communication device is powered off. The communication device includes a base station or a UE.

The processor may be connected to the memory via a bus, and may be configured to read the executable program stored on the memory, for example, as illustrated in at least one of FIG. 2 to FIG. 3.

A computer storage medium stored with an executable program is provided in embodiments of the disclosure. The executable program is configured to implement the method as described in the solutions of the first aspect or the second aspect, for example, as illustrated in at least one of FIG. 2 to FIG. 3, when executed by a processor.

Figure 6:
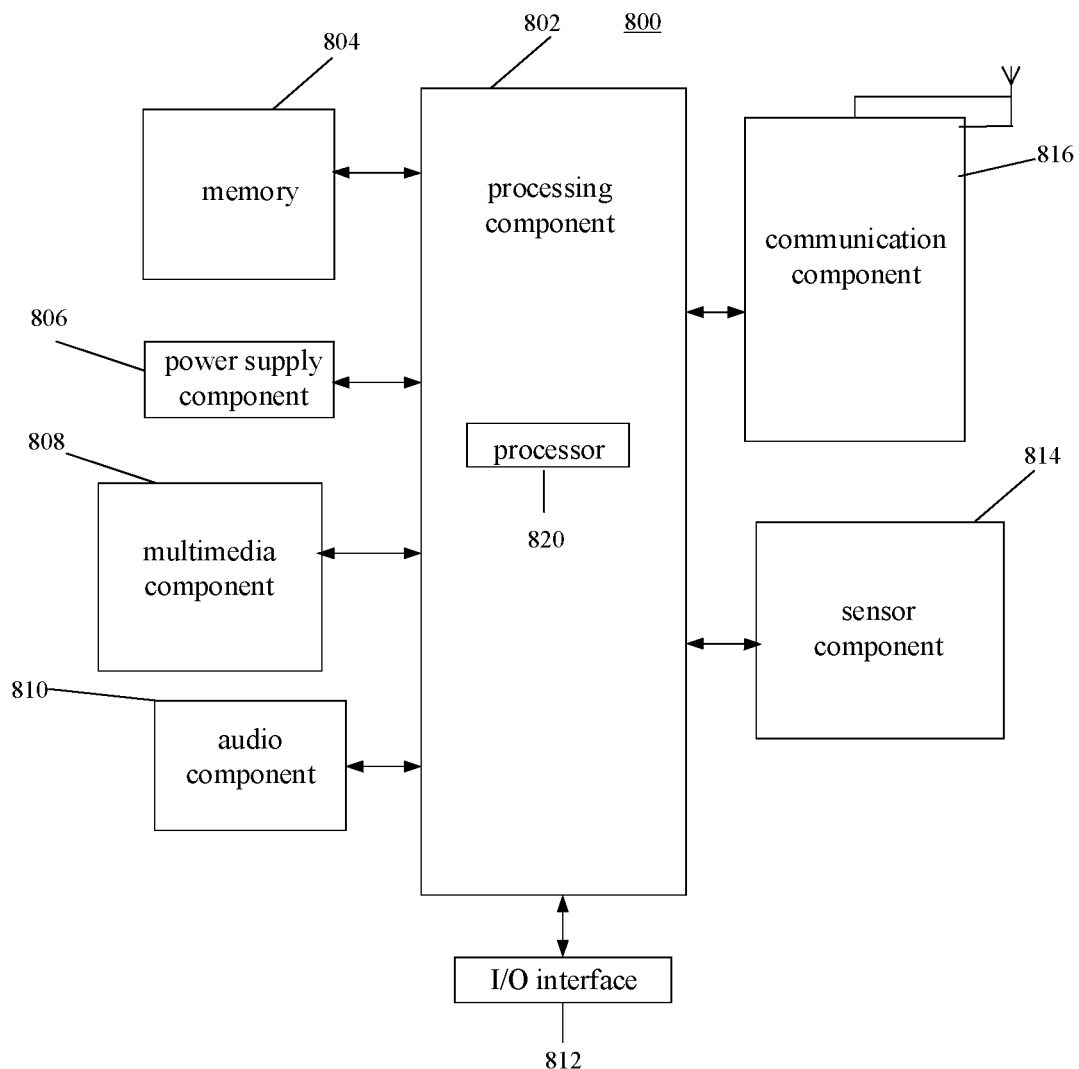
FIG. 6 is a block diagram illustrating a UE according to an exemplary embodiment.

FIG. 6 is a block diagram illustrating a UE 800 according to an exemplary embodiment. For example, the UE 800 may be a mobile phone, a computer, a digital broadcasting user equipment, a messaging device, a game console, a tablet device, a medical equipment, a fitness equipment, a personal digital assistant, etc.

Referring to FIG. 6, the UE 800 may include at least one component: a processing component 802, a memory 804, a power supply component 806, a multimedia component 808, an audio component 810, an input/output (I/O) of interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of blocks of the above method. In addition, the processing component 802 may include at least one module for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on the UE 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 may provide power supply for all components of the UE 800. The power supply component 806 may include a power supply management system, at least one power supply, and other components related to generating, managing and distributing power for the UE 800.

The multimedia component 808 includes an output interface screen provided between the UE 800 and a user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 808 includes a front camera and/or a rear camera. When the UE 800 in operation mode, such as shooting mode or video mode, the front camera or the rear camera may receive the external multimedia data. Each front camera and rear camera may be a fixed optical lens system or an optical lens system with a focal length and an optical zoom capacity.

The audio component 810 is configured as an output and/or input signal. For example, the audio component 810 includes a microphone (MIC). When the UE 800 is in operation mode, such as call mode, record mode, and speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The buttons may include but not limited to a home button, a volume button, a start button and a lock button.

The sensor component 814 includes at least one sensor configured to provide various aspects of status assessment for the UE 800. For example, the sensor component 814 may detect the on/off state of the UE 800 and the relative positioning of the component. For example, the component is a display and a keypad of the UE 800. The sensor component 814 may further detect the location change of the UE 800 or one component of the UE 800, the presence or absence of contact between the user and the UE 800, the orientation or acceleration/deceleration of the UE 800, and the temperature change of the UE 800. The sensor component 814 may include a proximity sensor, which is configured to detect the existence of the objects nearby without any physical contact. The sensor component 814 may further include a light sensor such as a CMOS or CCD image sensor, which is configured in imaging applications. In some embodiments, the sensor component 814 may further include an acceleration transducer, a gyroscope sensor, a magnetic sensor, a pressure sensor or a temperature sensor.

The communication component 816 may be configured for the convenience of wired or wireless communication between the UE 800 and other devices. The UE 800 may access wireless networks based on a communication standard, such as Wi-Fi, 2G or 3G, or their combination. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an exemplary embodiment, the UE 800 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

In an exemplary embodiment, anon-transitory computer readable storage medium including instructions is further provided, such as the memory 804 including instructions, the instructions may be executed by the processor 820 of the UE 800 to complete the above method. For example, the non-transitory computer readable storage medium may be a ROM, a random access memory (RAM), a CD-ROM, a magnetic tape, a floppy disk, an optical data storage device, etc.

Figure 7:
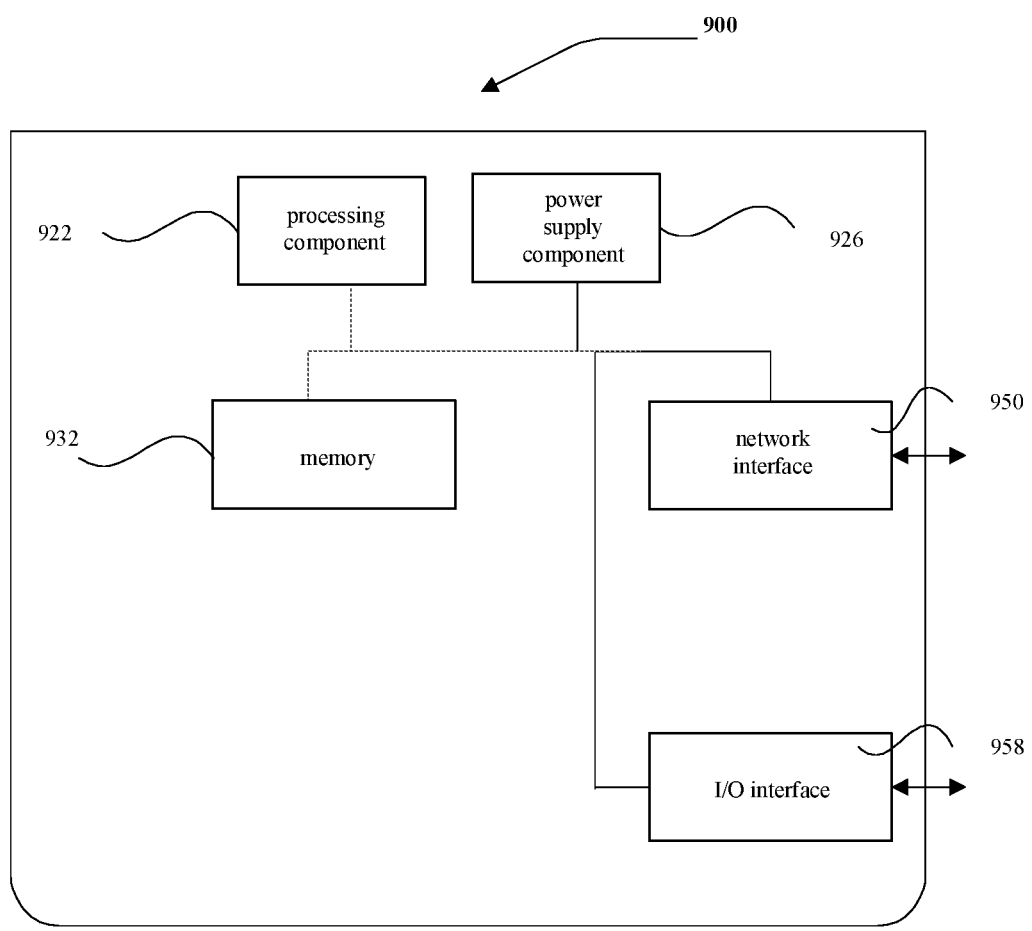
FIG. 7 is a block diagram illustrating a base station according to an exemplary embodiment.

FIG. 7 is a block diagram illustrating a structure of a base station according to one embodiment of the disclosure. For example, the base station 900 may be provided as a network device. As illustrated in FIG. 7, the base station 900 includes a processing component 922, which further includes at least one processor, and memory resources represented by the memory 932, which are configured to store instructions executable by the processing component 922, for example, an application. The application stored in the memory 932 may include one or more modules each of which corresponds to a set of instructions. In addition, the processing component 922 is configured to execute instructions, to execute any one method applied to the base station as described in the above method, for example, the method as illustrated in FIGS. 2 to 3.

The base station 900 may further include one power supply component 926 configured to execute power management of the base station 900, one wired or wireless network interface 950 configured to connect the base station 900 to a network, and one input/output (I/O) interface 958. The base station 900 may operate an operating system stored in the memory 932, for example, Windows Server™, Mac OS X™, Unix™, Linux™, FreeBSD™ or similar.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present invention is not limited to the precise structure described above and shown in the drawings, and various modifications and changes may be made without departing from its scope. The scope of the present application is only limited by the appended claims.

What is claimed is:

1. A method for sending a position reference signal (PRS), comprising:
sending, by a base station, a composite PRS based on a composite sequence;
wherein, the composite sequence comprises a plurality of sub-sequences; and a part of the composite PRS corresponding to a sub-sequence is a truncated PRS;
a bandwidth occupied by the composite PRS is greater than a bandwidth occupied by the truncated PRS; and the composite PRS and the truncated PRS are configured for positioning measurement of different types of user equipments (UEs);
wherein, sending the composite PRS based on the composite sequence, comprises:
repeatedly sending the composite PRS based on the composite sequence and a repetition configuration;
wherein, the repetition configuration comprises at least one of:
a number of repetitions, indicating the number of repetitions of the composite PRS; or
a repetition resource configuration, indicating a resource for repeating the composite PRS;
wherein, the repetition configuration comprises:
a time domain repetition configuration, indicating a time domain resource used for repeating the composite PRS in the time domain;
wherein, a plurality of repetitions of the truncated PRS are located on different symbols of a same frequency band in response to the repetition resource configuration being the time domain repetition configuration.

2. The method of claim 1, wherein,
the composite sequence is composed of the sub-sequences;
or,
the sub-sequence is formed by truncating the composite sequence.

3. The method of claim 1, wherein, at least two different types of UEs comprise: a first type UE and a second type UE; the bandwidth supported by the first type UE is less than the bandwidth supported by the second type UE; and the bandwidth occupied by truncated PRS transmission is less than or equal to the bandwidth supported by the first type UE.

4. A base station, configured to implement the method of claim 1, comprising:
a processor; and
a memory, configured to store instructions executable by the processor.

5. The method of claim 1, wherein,
a predetermined number of bit values in the plurality of sub-sequences are not the same; or
the plurality of sub-sequences split from the composite sequence are orthogonal.

6. The method of claim 1, wherein a start position of a first sub-sequence is a start position of the composite sequence and/or an end position of a last sub-sequence may be an end position of the composite sequence.

7. A method for receiving a PRS, comprising:
receiving, by a user equipment (UE), a composite PRS or a truncated PRS; wherein, the composite PRS is sent based on a composite sequence; and the truncated PRS is a part of the composite PRS, and sent based on a sub-sequence of the composite sequence; and
a bandwidth occupied by the composite PRS is greater than a bandwidth occupied by the truncated PRS; and the composite PRS and the truncated PRS are configured for positioning measurement of different types of UEs;
wherein, receiving the composite PRS or the truncated PRS based on the UE type, comprises:
repeatedly receiving the composite PRS or the truncated PRS based on the UE type and a repetition configuration;
wherein, the repetition configuration comprises at least one of:
a number of repetitions, indicating the number of repetitions of the composite PRS; or
a repetition resource configuration, indicating a resource for repeating the composite PRS;
wherein, repeatedly receiving the composite PRS or the truncated PRS based on the UE type and the repetition configuration, comprises:
repeatedly receiving the composite PRS or the truncated PRS on different symbols of a same frequency band based on a time domain repetition configuration, in response to the repetition configuration being the time domain repetition configuration.

8. The method of claim 7, wherein, receiving the composite PRS or the truncated PRS based on the UE type, comprises:
receiving the truncated PRS in response to the UE being a first type UE; and
receiving the composite PRS in response to the UE being a second type UE; wherein, the bandwidth supported by the second type UE is greater than the bandwidth supported by the first type UE.

9. A user equipment (UE), comprising a processor, a transceiver, a memory and an executable program stored on the memory and capable of being run by the processor, wherein,
the processor is configured to:
receive a composite PRS or a truncated PRS; wherein, the composite PRS is sent based on a composite sequence; and the truncated PRS is a part of the composite PRS, and sent based on a sub-sequence of the composite sequence; and
a bandwidth occupied by the composite PRS is greater than a bandwidth occupied by the truncated PRS; and the composite PRS and the truncated PRS are configured for positioning measurement of different types of UEs;
wherein, the processor is configured to:
repeatedly receive the composite PRS or the truncated PRS based on the UE type and a repetition configuration;
wherein, the repetition configuration comprises at least one of:
a number of repetitions, indicating the number of repetitions of the composite PRS; or
a repetition resource configuration, indicating a resource for repeating the composite PRS;
wherein the processor is configured to repeatedly receive the composite PRS or the truncated PRS based on the UE type and the repetition configuration by:
repeatedly receiving the composite PRS or the truncated PRS on different symbols of a same frequency band based on a time domain repetition configuration, in response to the repetition configuration being the time domain repetition configuration.

10. The UE of claim 9, wherein the processor is configured to:
receive the truncated PRS in response to the UE being a first type of UE; and
receive the composite PRS in response to the UE being a second type of UE; wherein, a bandwidth supported by the second type of UE is greater than a bandwidth supported by the first type of UE.

* * * * *